United States Patent [19]

Bosley et al.

[11] 4,086,368

[45] Apr. 25, 1978

[54] METHOD FOR PREPARING AND TREATING VEGETABLE SEGMENTS

[75] Inventors: Roy E. Bosley; Paul T. Mann, both of Caldwell; Gary D. Decoteau, Nampa, all of Id.; Kert F. Ivie, Franklin, Mass.; Elden D. Winslow, Caldwell, Id.

[73] Assignee: J. R. Simplot, Boise, Id.

[21] Appl. No.: 723,845

[22] Filed: Sep. 16, 1976

Related U.S. Application Data

[63] Continuation-in-part of Ser. No. 569,960, Apr. 21, 1975, abandoned.

[51] Int. Cl.² .................... B26D 9/00; A23B 7/03
[52] U.S. Cl. ............................. 426/464; 83/2; 83/30; 426/473; 426/518; 426/809
[58] Field of Search .................... 99/646 R, 485; 83/404.1, 404.3, 404.4, 425.1, 408, 30, 733, 2, 403; 426/464, 456, 457, 465, 509, 518, 809, 473

[56] References Cited

U.S. PATENT DOCUMENTS

| 2,541,180 | 2/1951 | Urschel et al. | 83/404.1 |
| 2,998,041 | 8/1961 | Urschel et al. | 83/2 |
| 3,141,484 | 7/1964 | Lowe et al. | 99/646 R |
| 3,196,913 | 7/1965 | Stahmer | 99/646 R |
| 3,381,731 | 5/1968 | Bath et al. | 83/2 |
| 3,644,129 | 2/1972 | Sloan | 426/509 X |
| 3,988,953 | 11/1976 | Bosley et al. | 99/458 X |
| 3,988,976 | 11/1976 | Skzak | 99/485 |

OTHER PUBLICATIONS

Arsdel et al.; Food Dehydration, vol. 2; AVI Pub. Co. Inc., Westport, Conn., 1973; pp. 31, 60, 80, 101, 509.
Bender; Dictionary of Nutrition and Food Technology, 3rd Ed., Archon Books, London Butterworths; 1968, p. 28.

*Primary Examiner*—S. Leon Bashore
*Assistant Examiner*—Kenneth M. Schor
*Attorney, Agent, or Firm*—Plumley & Tyner

[57] ABSTRACT

A process and apparatus for making holes in vegetable segments wherein the hole-making step is integrally connected with the steps of cutting and slicing of the segments prior to blanching, dehydrating and/or rehydrating whereby the time of processing of vegetable segments can be quite substantially reduced.

8 Claims, 4 Drawing Figures

METHOD FOR PREPARING AND TREATING VEGETABLE SEGMENTS

This application is a continuation-in-part of U.S. Ser. No. 569,960, filed Apr. 21, 1975, and now abandoned.

This invention relates to the processing of dehydrated and partially dehydrated vegetable segments and more particularly to an improved method and apparatus for such processing of potato segments.

Vast quantities of dehydrated and partially dehydrated vegetable segments are produced in vegetable processing plants near major growing areas which are remote from centers of population. The removal of water from such segments is an important consideration inasmuch as it can greatly reduce cost of freight of such segments from the growing areas to locations nearer population centers where said segments are normally reconstituted for and use in a variety of products, e.g., soups, stews, and potato salads.

The removal of water from vegetable segments requires a considerable amount of energy, thus, a means of accelerating the rate of drying is a means of conserving energy and time or increasing productivity.

In a typical vegetable processing operation, such as the case of potatoes, potatoes are received from the field or storage, washed by being flumed to sizers, thence to peelers in which peeling may be accomplished by hot caustic solutions, steam, abrasion, or other means well known in the art. After peeling, potatoes are inspected, trimmed of defects, and cut into segments.

After cutting, in such a typical operation, segments are transported to a blancher by flumes to wash segment surfaces free of starch, thereby preventing segments from sticking together in the dryers. Blanching is normally accomplished by hot water, steam, or other means known to the art, in which the segment temperature is raised to a sufficient level to inactivate enzymes. If enzyme inactivation does not occur, discoloration of the segments results, reducing quality. In addition to inactivating enzymes, blanching potato segments softens the texture. As an end manufactured product, the texture or degree of firmness of potato segments will depend on the ultimate end use. Thus, the blanching parameters of time and temperature will depend on the segment size, quantity, and texture desired which is apparent to those skilled in the art.

Blanched segments may be dried in a continuous dryer or other forms of dryers known to those skilled in the art. In a continuous dryer, blanched segments are fed onto a continuous horizontal wire mesh belt which passes through the dryer. The segments are subjected to heated circulating air moving with considerable speed. As the belt moves through the dryer, the segments are turned and the temperature is decreased. In such a typical operation the final moisture content of the dehydrated segments is about 6 percent on a dry weight basis. The dehydrated segments are yellowish in color, wrinkled, with the centers of the surfaces depressed and hard. Dehydrated segments are also brittle and can be crushed easily.

The production of partially dehydrated potato segments is similar to that described for dehydrated potato segments except that the segments are usually dried to about 50 percent of their original weight and are then frozen. The moisture content (dry weight basis) of such segments will vary from about 50% to about 75% depending on the solids content of the potatoes.

Reconstitution of dehydrated and partially dehydrated potato segments depends upon the equipment used, the quantity of segments, the dimension of segments, and the like. Generally, reconstitution of dehydrated and partially dehydrated potato segments is accomplished by simmering in water and by retorting or canning. When dehydrated or partially dehydrated potato segments are retorted, they are incorporated as part of another product, e.g. soups, stews, and hash, and the retort conditions vary with the size and quantity of containers, other ingredients and other factors known to those skilled in the art.

We have discovered that substantial improvements in the overall process of producing dehydrated and partially dehydrated vegetable segments can be obtained by an apparatus and process whereby and wherein vegetable segments are perforated i.e. actual holes are made as an integral part of and simultaneously with the usual cutting and slicing steps.

Perforated potato segments of this invention are processed in the same manner as non-perforated potato segments which insure production of a high quality, wholesome product. The perforations or holes accelerate the processing of potato segments at a rate heretofore not possible, resulting in the conservation of energy and time, and thus increased productivity. Also, this invention creates new product capabilities heretofore economically unfeasible.

Processing potato segments according to our invention accelerates blanching by water or steam, dehydration, and reconstitution. The benefits of our invention are derived from the volume of the hole or perforation and the increased evaporation surface to segment volume ratio.

The benefits of perforating potato segments depends on the volume of the hole perforation and dimension of the segment, among other things. If the perforation volume or hole is too small, little benefit will be derived, and if the perforation volume is too large, the physical integrity of the potato segment is damaged and segment collapse results. The optimal amount of perforation can be achieved by making holes partially or complete through one dimension completely in the segment. Complete perforation allows water to escape segments from two sides, which is of course of more benefit than partial penetration of the perforations or holes.

Segmenting whole, peeled, washed, and trimmed potatoes is accomplished by the sue of machines well known to those familiar with the art such as for example the well known vegetable slicing and dicing machines manufactured by Urschel Laboratories, Inc. of Valparaiso, Ind., such as described in U.S. Pat. Nos. 2,603,262, 2,436,410 and 2,465,670. Perforating potato segments as an integral part of the cutting operation is accomplished according to this invention by modifying such a well known, mechanical vegetable cutting and dicing machine.

Processing perforated potato segments accelerates blanching by permitting hot water to come in contact with the interior of the segments increasing the temperature of the segment more quickly than heretofore possible. Thus, enzymes are inactivated and the desired texture is achieved more quickly.

During drying of perforated potato segments, according to our invention, water does not have to diffuse as great a distance before reaching a surface from which to escape from a segment into drying medium. Also, perforations provide an avenue of escape for water through the case-hardened surface which develops during the dehydration process and through which water diffuses slowly; thus, potato segments with perforations do not require as high a drying temperature to force water from the segments, which conserves time and energy.

The benefit in reconstituting perforated segments lies also in the reduction in time required or an increase in amount of water absorbed. Perforated segments rehydrate to specific reconstitution ratios in less time than non-perforated segments. This occurs with both dehydrated and partially dehydrated segments. The time of reconstitution will vary with methods, temperatures, quantities, and dimensions of segments, among other factors which are apparent to those skilled in the art.

The canning industry processes are under USDA - FDA standards of identity and/or process control points. Since these processing times are strictly controlled, one cannot shorten the process to achieve the same degree of water uptake. Hence, the perforated products will ultimately pick up to 20 to 50 percent more moisture in the final reconstituted product yielding greater recoveries and/or reduction of potato products.

More specifically, although it has long been accepted by those skilled in the art that the maximum vegetable segment thickness for commercial dehydration is ⅜ inch, our invention makes it economically and practically feasible for the first time to dehydrate as well as reconstitute vegetable segments of good quality, which are thicker than ⅜ inch, i.e. from ⅜ to 1 inch and above in thickness. At an overall rate substantially greater than heretofore possible, this is accomplished according to our invention by simultaneously cutting elongated vegetable strips into segments and at the same time making a plurality of holes in each of said segments, extending from ½ to all the way through said segments, the volume of the resulting holes being in the range of 0.5 to 50% of the volume of each segment and thereafter blanching and dehydrating the blanched segments to less than about 75% moisture content on a dry weight basis. By the practice of this invention there are avoided a multiplicity of steps and machines in the cutting into segments and in the perforation of the segments. Furthermore, a considerable saving of time and energy is effected, compared with the prior art and conventional practice, in the blanching, dehydration and rehydration of vegetable segments.

IN THE DRAWINGS

Figure 2:
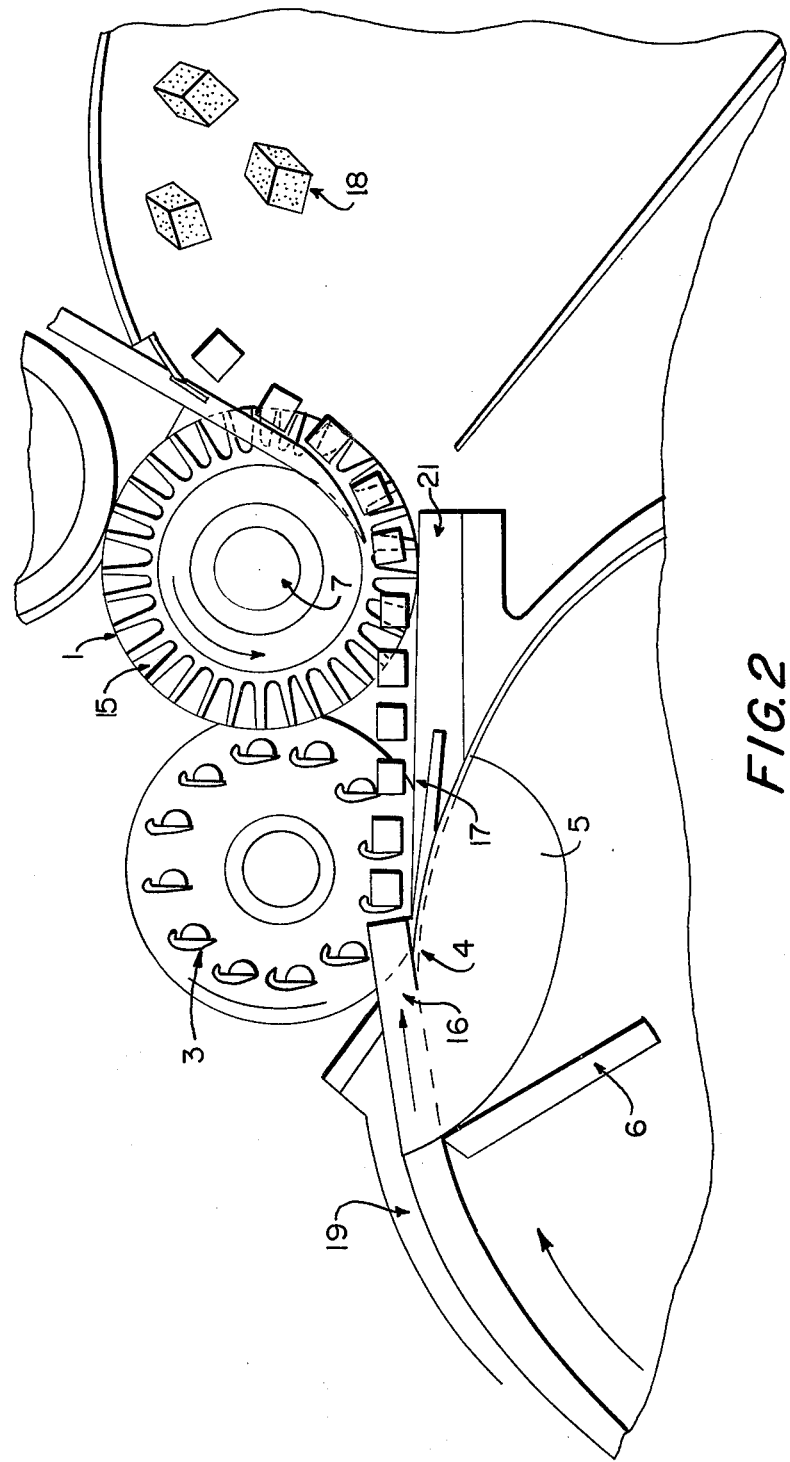
FIG. 2 is a schematic drawing of part of a mechanical vegetable and fruit cutting and dicing machine of the Urschel type used in the process of this invention, to illustrate the flow of material through the cutter and the position of a perforating knife.
Figure 3:
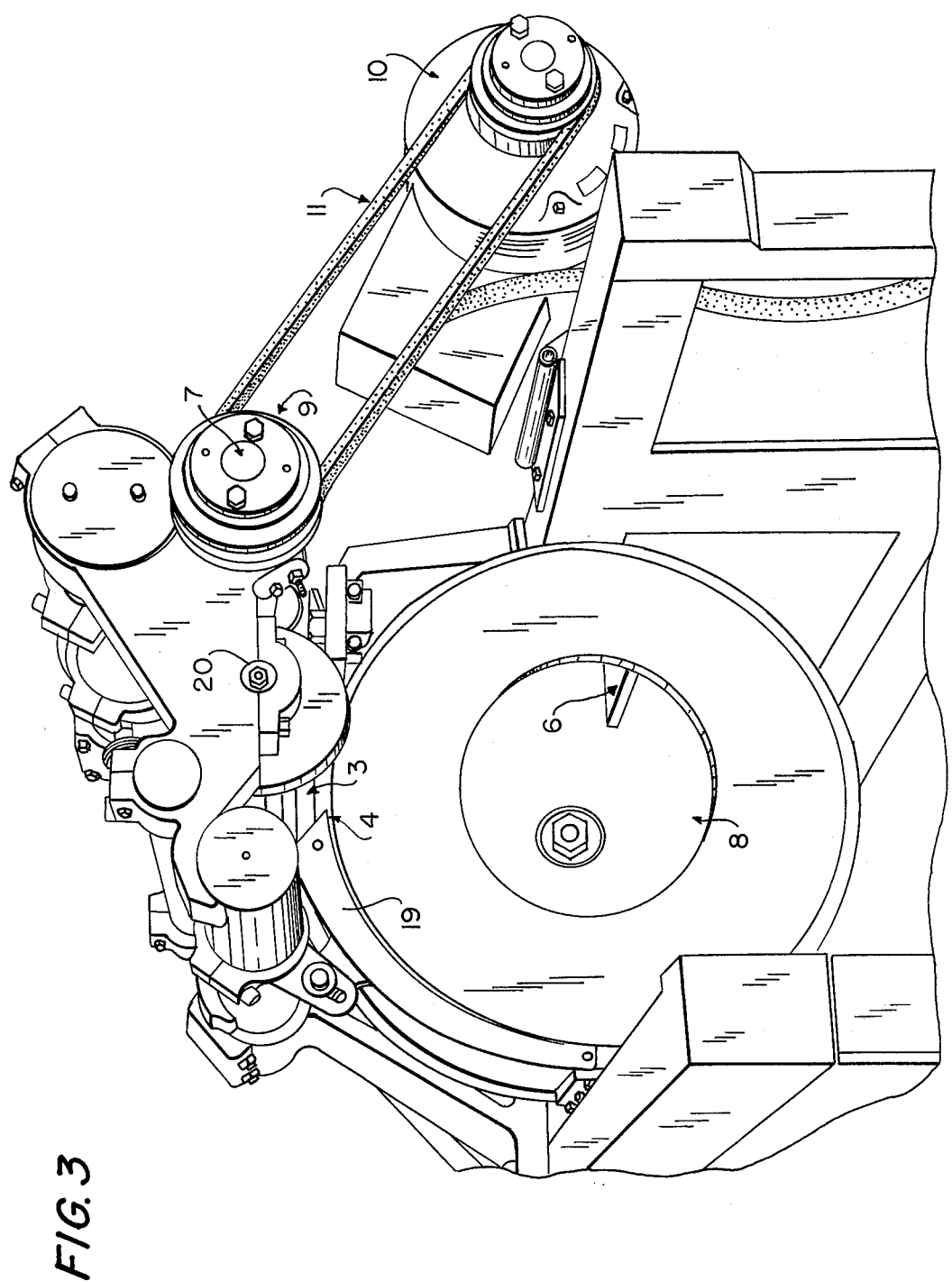
FIG. 3 is a view from the side in which material enters a vegetable and fruit dicing and cutting machine modified according to this invention. The auxiliary motor, belts, and pulley connected to an elongated circular knife spindle are shown.

In the apparatus of the present invention, whole, peeled, washed and trimmed potatoes enter the slicing and dicing machine (FIG. 3) through the end of a drum 8 shown in FIGS. 2 and 3 in which revolving impeller blades 6 rotate potatoes with sufficient velocity so that centrifugal force holds the potatoes against the drum assembly 19. With each revolution of a potato, a slab 16 is cut by a slicing knife 4 located in the path of the rotating potato 5. The slabs are then cut into elongated segments 17 by a series of rotating crosscut knives 3 positioned parallel to a horizontal spindle 20. The elongated segments 17 move across the slicing knife holder 21 into contact with rotating circular knives 15, positioner perpendicular to a horizontal spindle 7 and perpendicular to the crosscut knives 3, which produce dice 18. The circular knives thus cut the third dimension of the potato segment.

To perforate potato segments as an integral part of the slicing and dicing operation, just described, perforating knives 1,2 are placed between circular knives 15. Each perforating knife is notched so that the tissue of the segment is perforated as it passes between the circular knives 15.

In a vegetable dicing and slicing machine such as the Urschel type previously described, we have found that the rotational velocity of the circular knife 15-perforating knife 1,2 assembly-must be slower in relationship to the rotational velocities of the impeller 6 and crosscut knives 3-to avoid production of non-uniform perforations and even tearing of the potato segment tissue being perforated.

In order to synchronize the rotational velocity of the circular knives 15-perforating knives 1,2 and strips 17 with the speed of the assembly, an auxiliary variable speed motor 10 is connected by belts 11 and pulleys 9 to the spindle 7. This makes possible separate control of the speed of spindle 7 and hence the assembly of circular knives 15 and perforating knives 1,2. Also, in an Urschel type machine such as previously mentioned, a gear such as might normally exist at collar 21 is removed so that the spindle 7 is not activated by the primary motive force of the machine which drives.

The rotational velocity of the circular knife spindle is changed by simply adjusting the speed of the variable speed motor until acceptable perforations result with little or no tearing of the potato segment tissue.

Other means for synchronizing the velocity of circular knives 15-perforating knives 1,2 as mentioned above may be employed such, for example as sprockets and chains, gears and the like.

Figure 1:
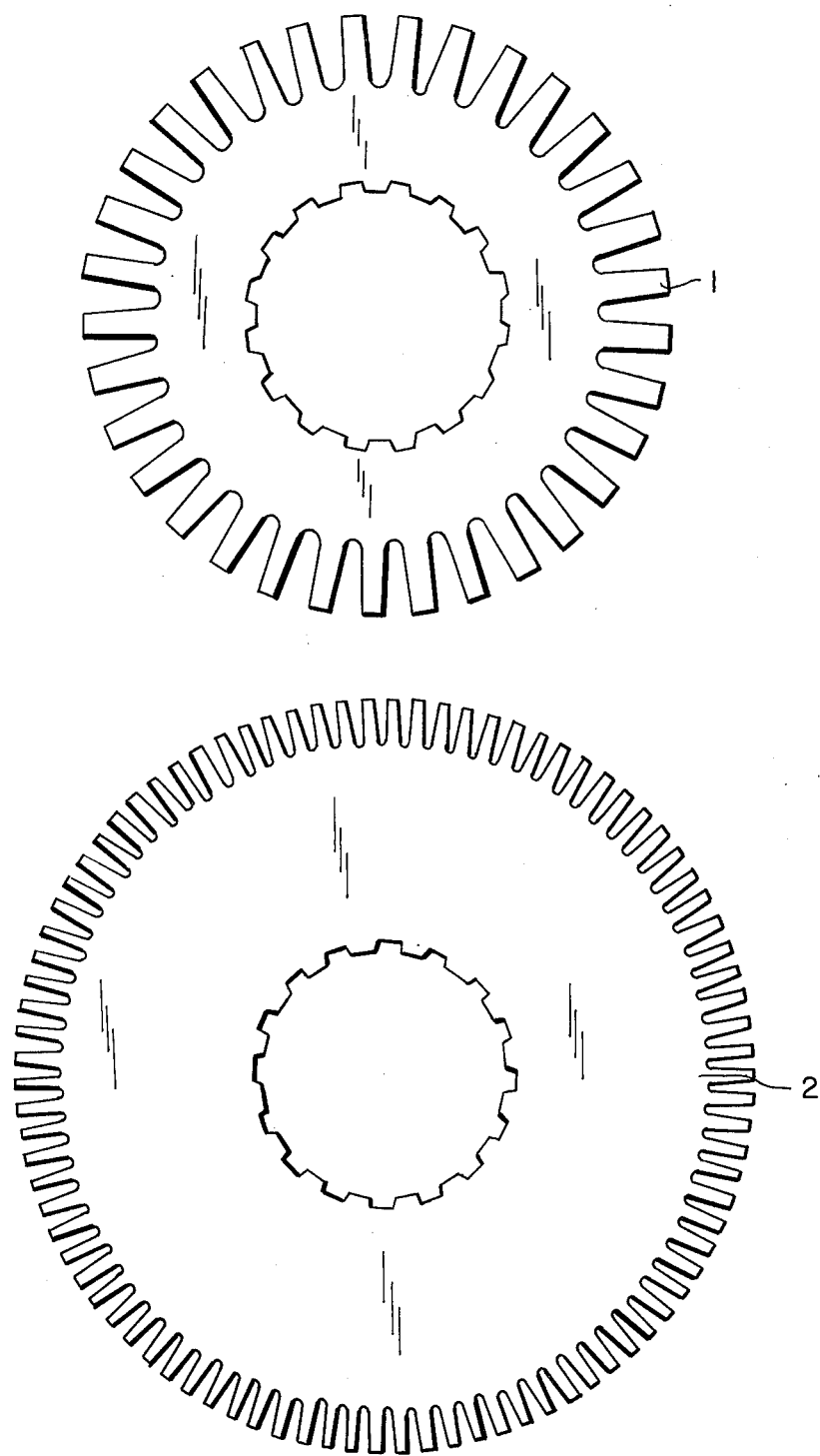
FIG. 1 is a side view of two perforating knives, of this invention, with different diameters and with different sized teeth.

The shape and size of the segments are controlled by the spacing of the slicing 4, crosscut 3, and circular knives 15. The total volume of perforation is dependent on the geometry of the perforating tooth, spacing of teeth on the knive (FIG. 1), and number of perforating knives 1,2 positioned between circular knives 15. The advantages of dehydrating perforated potato segments will be illustrated with segments with different dimensions and different amounts of perforation. However, the advantages of dehydrating perforated potato segments are not limited to the segment configurations used herein as illustrations.

EXAMPLE 1

The effects of blanching are evident in visual comparison of perforated and non-perforated 1 × 1 × ½ inch segments which were blanched for 2 minutes at 190° F. No chemical antioxidants or preservatives were added to the blanch water. The non-perforated segments had significantly moe discolored segments after setting overnight than the perforated segments. Perforated ½ inch slices that were blanched for 2 minutes at 190° F. in water without preservatives or antioxidants had less peroxidase enzyme activity than non-perforated slabs. This was inferred from comparisons with known color standards.

There is usually a small amount of preservative added to blanching water to aid the control of segment discoloration. Perforated segments absorb more preservatives than non-perforated slabs. Ten pounds of perforated and non-perforated slabs were blanched for 1 and 2 minutes in 100 pounds of water containing 1 percent sodium bisulfite at 190° F. The perforated slabs contained 416 p.p.m. of sodium bisulfite measured as $SO_2$ for both blanching times. The non-perforated slabs contained 288 and 282 p.p.m. of $SO_2$ for the 1 and 2 minute blanches respectively.

EXAMPLE 2

Figure 4:
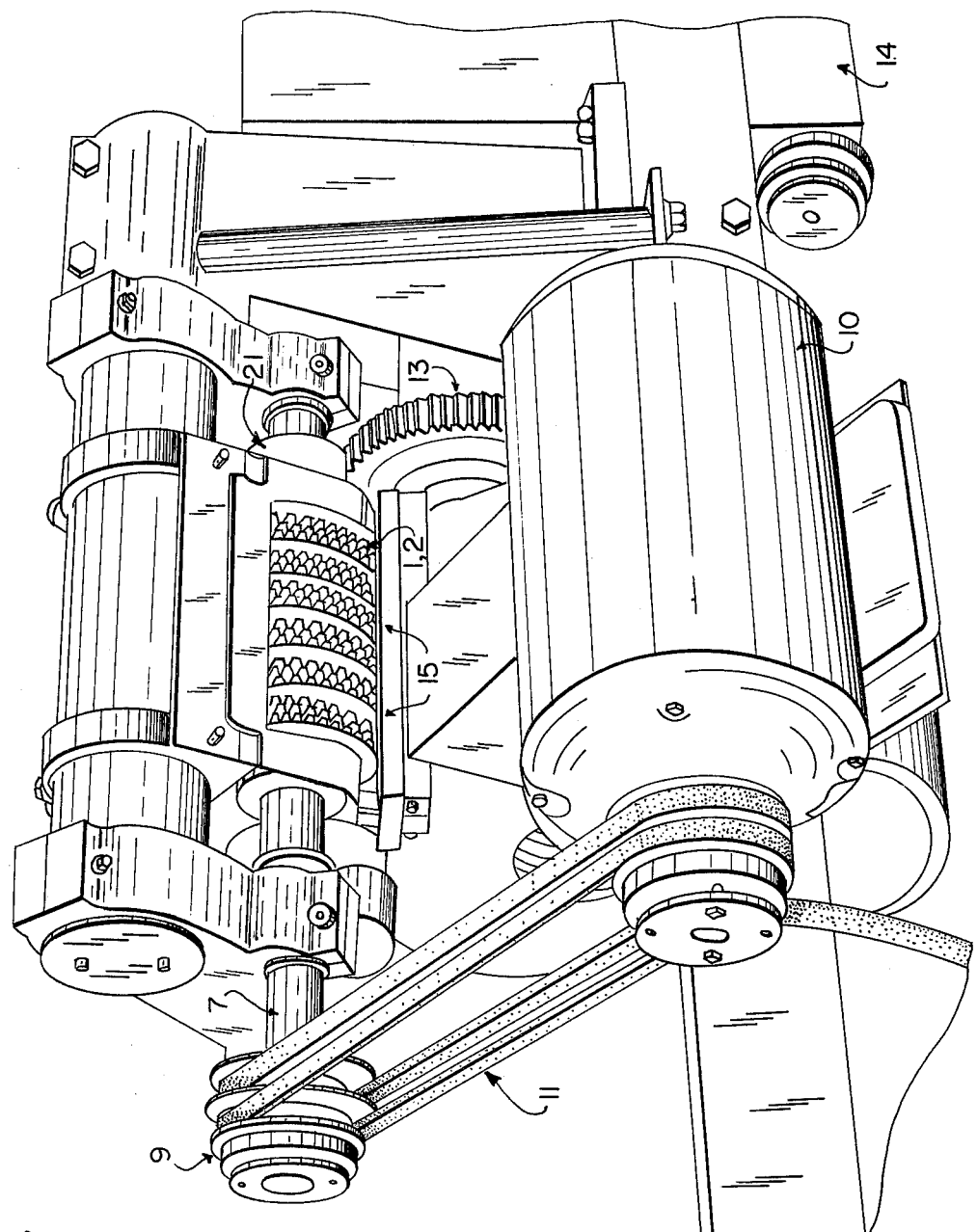
FIG. 4 is a right end view, or discharge side, of the machine shown in FIG. 3 with extension of circular knife spindle showing. The perforating knives are shown positioned between circular knives.

To illustrate the advantages of dehydrating potato segments with a small volume of perforation, 1 × 1 × ¾ inch segments were cut from whole, washed, and trimmed potatoes with a modified cutting and dicing machine such as shown in FIGS. 3 and 4 as described previously. The ¾ inch dimension was cut with the slicing knife 4, and the crosscut 3 and circular knives 15 each cut a 1 inch dimension. Non-perforated segments were cut on a commercial vegetable dicing and slicing machine.

Perforated segments were produced by placing a single perforating knife 1 equidistance from the circular knives. The depth of penetration were ⅛ the depth of the product.

The volume of the perforations was 0.6 percent of the volume of the segment. After cutting, 10 pounds of segments were hand sorted to insure that only full sized segments were further processed. Ten pounds of such segments were blanched in 100 pounds of water at 180° F, for 10 minutes. Then the segments were placed on a tray in a dryer for dehydration. The dryer temperature was set for 204° F, and varied between 198° and 210° F. Half of the drying air was recycled through the dryer. To facilitate collection of drying data, the drying tray was mechanically connected to a load cell positioned on top of the dryer. Output from the load cell was obtained from a calibrated digital readout. The perforated segments dried to 2½ pounds in 55 percent of the time the non-perforated segments dried to 2½ pounds. The times required were 125 and 229 minutes respectively.

EXAMPLE 3

By changing the spacing of the cutting knives, a different sized potato segment can be produced. Thus, to produce ⅜ inch cubes, the slice 4, crosscut 3, and circular knives 15 were all adjusted for 154 inch. As in the second example, perforating knives 1 were positioned between circular knives 15. Perforation knives 1 were spaced on ⅛ inch centers. The spindle 7 for the circular knives was lengthened to facilitate connecting an auxiliary motor 10 to reduce the rotational velocity of the circular knife spindle 7 to about 720 r.p.m. The volume of perforation was approximately 9.7 percent and the penetration was completely through the product. Ten pounds of perforated dice were blanched for 8 minutes in 100 pounds of water at 180° F. containing a small amount of preservative. The samples were dried in a tray dryer with half of the circulating air being recycled. The drying temperature schedule was as follows: 200° F. for 30 minutes, 180° F for 30 minutes, and 150° F. until dehydrated. Ten pounds of non-perforated-dice were processed in an identical manner. The perforated dice dried to 7.2 percent moisture content, in 105 minutes, in contrast to the non-perforated dice which dried to 7.5 percent moisture content in 330 minutes. The perforated dice dried in about ⅓ the time required for the non-perforated dice to dry.

EXAMPLE 4

Slices were cut by removing the circular 15 and crosscut knives 3. The slice thickness was ¼ inch which was controlled by the slicing knife 4 setting. Slices from whole, peeled, and trimmed potatoes were blanched for 10 minutes in 100 pounds of water 170° F. containing a small amount of preservative. Slices were dehydrated in a tray dryer with the following temperature schedule: 200° F for 30 minutes, 180° F. for 60 minutes, and 150° F until dehydration was complete. Slices 16 were perforated by placing perforating knives on ⅜ inch centers on the circular knife spindle 7. Thus, as the slices 16 passed beneath the circular knife spindle 7 they were perforated. The volume of the perforations was approximately 4 percent of the volume of the slices. Perforated slices were processed in the same manner as the non-perforated slices. The perforated slices dried to 7.5 percent moisture content in 5 hours in contrast to non-perforated slices which required 8½ hours to dry 7.8 percent moisture content. The perforated slices dried in about 59 percent of the time that the non-perforated required.

EXAMPLE 5

Dehydrated ⅛ inch random slices were reconstituted in simmering water. Fifty grams of non-perforated and perforated slices were reconstituted in 2 cups of water that had been brought to a boil. The perforated slices achieved a reconstitution ratio of 1:3.76 in about 67 percent of the time required by the non-perforated slices. Perforated dice also rehydrate more quickly than non-perforated dice.

EXAMPLE 6

Three-eights inch dice were reconstituted by placing 50 grams in 952 ml. of tap water. The water was brought to a boil within 2 minutes and simmered until segments rehydrated to approximately their origiinal form. The perforated product reconstituted to a reconstitution ratio of 1:3.5 in 33 percent of the time required by the non-perforated segments to achieve the same ratio.

EXAMPLE 7

Partially dehydrated potato segments, perforated and non-perforated, 1 × 1 × ½ inch were reconstituted by placing 4 ounces of segments in water that had been brought to a boil and then simmered until the products rehydrated to a reconstitution ratio of 1:1.6 in 65 percent of the time required for the nonperforated segments to achieve the same reconstitution ratio.

EXAMPLE 8

To illustrate the advantages of processing other perforated vegetables, whole, washed, and peeled carrots were cut into ½ inch dice by adjusting the slice 4, the crosscut 3, and circular knives 15 for ½ inch. The perforating knives 1,2 were positioned on ¼ inch centers. The volume of the perforation was 3.6 percent of the volume of the segment as in Examples 2, 3, 4, the circular knife spindle 7 was connected to an auxiliary variable speed motor 10 by bolts 11 and pulleys 9 so that the rotational velocity of the circular knife 15-perforating knife 12 assembly was changeable to optimize the perforating of the carrot segments, non-perforated carrot dice were cut on a commercial vegetable slicing and dicing machine. Perforated and non-perforated carrot dice were blanched for 10 minutes in 100 pounds of water at 180° F.

One thousand grams of perforated and non-perforated ½ inch carrot dice were dried to a tray dryer at 180° F. The product weight was 130 grams, drawing a moisture content of about 8 percent. One-half of the drying air was recycled.

The perforated carrot dice dried in 67 minutes in contrast to the non-perforated carrot dice which required 170 minutes to dry. The perforated carrot dice dried in 40 percent of the time the non-perforated dried.

EXAMPLE 9

Dehydrated perforated and non-perforated carrot dice were reconstituted by simmering in water. The perforated carrot dice reconstituted to a rehydration ratio of 3.5 in 7 minutes in contrast to the non-perforated carrot dice which rehydrated to a reconstituted ratio of 3.5 in 13 minutes. The perforated carrot dice reconstituted to their original form in approximately 54 percent of the time required by the non-perforated carrot dice. Following the same procedures as described in the foregoing Examples 1 inch cubes were processed. The control samples were processed without perforation, whereas the experimental cubes were perforated with 3/32 inch wires on ¼ inch centers, resulting in nine perforations or holes per cube. The control and perforated cubes were blanched at 175° F water from 26 to 36 minutes depending upon the firmness of the potatoes to produce the same degree of cook. The cubes were quenched in tap water for 2 minutes. For dehydration, the cubes were placed on suspended trays connected to a load cell in a Proctor and Swartz static dryer. The cubes were dried at a constant 180° F. The control dice required 250% as long to dry as the perforated cubes, i.e., 1100 vs. 420 minutes.

The dehydrated 1 inch cubes were reconstituted in a stationary report, in a 3% flour solution and 250° F at 17 pounds steam pressure for 70 minutes. The control dice had a constitution ration of 3.2 whereas the perforated dice had a reconstitution ration of 4.8. It was apparent from these examinations of the two products that the perforated cubes retained almost their original shape and appearance with sides that were straight and not concave. They had acceptable color being white, whereas the control dice had concave sides, extremely thick rubbery skin and a very dark brown center.

While in the foregoing examples, specific times and temperatures have been given to illustrate this invention, the invention is not limited thereto. Variations in times, temperatures, and the like from the before mentioned values occur from time to time depending upon the equipment used and the characteristics of the potatoes and the potato segments themselves. The moisture content of vegetables varies depending on type of vegetable growing environment, and storage environment. When vegetables with unusually high moisture contents are processed, more water than the usual amount of water would be driven off, which would require more time and energy. Conversely, if vegetables with lower than the usual amount of water would be driven off which would require less time and energy.

The benefits of processing perforated vegetable segments will vary with variety of vegetables, individual vegetable within varieties, and segments within individual vegetables.

However, processing perforated vegetable segments is considerably faster than hitherto possible.

The benefits of processing perforated segments are not limited to the size or dimension of segments or type of vegetable illustrated in the examples, nor are the benefits limited to perforation volumes illustrated. These volumes must be considered ranges. Benefits of dehydrating perforated segments will be achieved with less volume of perforation, but as the volume approaches zero, the benefits would be so small that it would be impractical to process. Increasing the volume of perforation will have additional benefits in requiring less time to dry until the physical integrity of the segment is lost and the segment collapses.

We claim:

1. In the production of at least partially dehydrated vegetable segments of improved physical character for reconstitution, the improvement which comprises:
    1. providing a machine having means for cutting elongated vegetable strips into segments and separate means for perforating said segments;
    2. simultaneously by using said cutting means cutting elongated vegetable strips into segments and at the same time, by using said perforating means, making a plurality of holes in each of said segments, said holes extending from ⅛ to all the way through said segments, the volume of the resulting holes being in the range of 0.5 to 50% of the volume of each segment and;
    3. thereafter blanching the vegetable segments and subsequently dehydrating the blanched segments to less than about 75% moisture content on a dry weight basis.

2. The process of claim 1 in which the dehydrated segments are reconstituted by their incorporation as part of a water containing product.

3. The process of claim 1 in which the holes extend completely through the segments.

4. The process of claim 1 in which the holes extend partially through the segments.

5. The process of claim 1 in which the segments are potato segments.

6. The process of claim 1 in which the segments are carrot segments.

7. A process for the production of at least partially dehydrated vegetable segments which comprises (1) introducing a vegetable into a drum and rotating said vegetable, by means of an impeller blade, with sufficient velocity that centrifugal force holds the vegetable against the inner wall of said drum; (2) with each revolution of said vegetable, cutting a slab thereof by means of a slicing knife located in the path of said rotating vegetable; (3) thereafter cutting said such slab into elongated strips of predetermined cross-section whose longest dimension is perpendicular to the path of travel of said slab by means of rotating knives positioned operatively perpendicular to the path of said slab; (4) then passing said elongated strips into contact with an assembly of rotating knives circular knives and perforating knives so as to simultaneously segment said strips using the circular knives and make holes in said segments using the perforating knives, wherein said holes extend from ⅓ to all the way through said segments and the volume of the holes is in the range of 0.5–50% of the volume of each segment. (5) synchronizing the rotational velocity of said assembly with the linear velocity of said elongated strips; (6) blanching the resultant perforated segments; and (7) dehydrating said resultant blanched segments to less than about 75% moisture content on a dry weight basis.

8. In the production of at least partially dehydrated vegetable segments of improved physical character for reconstitution, the improvement which comprises:

1. providing a machine having two sets of knives.
2. by use of one set of knives simultaneously cutting elongated vegetable strips into segments and at the same time with a different set of knives making a plurality of holes in each of said segments, the volume of the resulting holes being in the range of 0.5 to 50% of the volume of each segment and the holes extending from ⅓ to all the way through said segments and;
3. thereafter blanching the vegetable segments and subsequently dehydrating the blanched segments to less than about 75% moisture content on a dry weight basis.

* * * * *